US012766074B2

(12) United States Patent
Ramirez et al.

(10) Patent No.: US 12,766,074 B2
(45) Date of Patent: Oct. 20, 2026

(54) MEDICATION CONTAINER AND LID THEREFOR

(71) Applicant: United States Government As Represented By The Department Of Veterans Affairs, Washington, DC (US)

(72) Inventors: Jason Ramirez, Salt Lake City, UT (US); Taylor Wahlig, Omaha, NE (US); Alison Quinn, Memphis, TN (US); Mark Drinkwater, Boston, MA (US); John T. Miller, Richmond, VA (US); Brian Burkhardt, Richmond, VA (US)

(73) Assignee: United States Government as represented by the Department of Veterans Affairs, Washington, DC (US)

( * ) Notice: Subject to any disclaimer, the term of this patent is extended or adjusted under 35 U.S.C. 154(b) by 18 days.

(21) Appl. No.: 18/825,479

(22) Filed: Sep. 5, 2024

(65) Prior Publication Data

US 2025/0073129 A1 Mar. 6, 2025

Related U.S. Application Data

(60) Provisional application No. 63/580,494, filed on Sep. 5, 2023.

(51) Int. Cl.
*A61J 7/04* (2006.01)
*A61J 1/03* (2023.01)

(52) U.S. Cl.
CPC ............... *A61J 7/0409* (2013.01); *A61J 1/03* (2013.01)

(58) Field of Classification Search
CPC .... A61J 1/03; A61J 1/14; A61J 1/1437; A61J 7/04; A61J 7/0409; A61J 7/0427;
(Continued)

(56) References Cited

U.S. PATENT DOCUMENTS 6,938,757 B2 * 9/2005 Eastman .............. B65D 55/026 206/459.1
7,392,918 B2 7/2008 Holloway et al.
(Continued)

FOREIGN PATENT DOCUMENTS

CN 117068557 A * 11/2023 ............. B65D 81/32
WO WO-2011121372 A1 * 10/2011 ............ A61J 7/0076

*Primary Examiner* — Bryon P Gehman
(74) *Attorney, Agent, or Firm* — Ballard Spahr LLP

(57) ABSTRACT

A lid for inactivating or otherwise deterring use of a medication in a medication container is disclosed. The lid has a body that is configured to be secured to the medication container. A receptacle has a deterrent composition therein. A sharp object is movable from a first position that is spaced from the receptacle to a second position in which the sharp object punctures the receptacle. A controller is operable to: initiate a timer having a set duration; and cause the sharp object to move from the first position to the second position upon expiration of the set duration of the timer. A compression assembly applies a pressure to the receptacle so that, when the sharp object moves from the first position to the second position to puncture the receptacle, the compression assembly facilitates flow of the deterrent composition from the receptacle.

20 Claims, 7 Drawing Sheets

(58) Field of Classification Search
CPC ..... A61J 7/0445; A61K 31/485; A61K 47/12; A61K 47/38; A61M 5/50; A61M 39/10; A61M 39/1011; B65D 25/08; B65D 81/32; B65D 81/3205; B65D 85/00
USPC .................................................. 206/534, 807
See application file for complete search history.

(56) References Cited

U.S. PATENT DOCUMENTS

| | | | | |
|---|---|---|---|---|
| 8,483,872 | B2 | 7/2013 | Ratnakar | |
| 8,579,116 | B2 * | 11/2013 | Pether | B65D 50/068 222/362 |
| 8,985,388 | B2 | 3/2015 | Ratnakar | |
| 9,043,015 | B2 | 5/2015 | Ratnakar | |
| 9,046,403 | B2 | 6/2015 | Ortenzi et al. | |
| 9,061,879 | B2 * | 6/2015 | Patthey | A61J 7/0409 |
| 9,492,355 | B2 | 11/2016 | Ratnakar | |
| 9,636,279 | B2 | 5/2017 | Song et al. | |
| 9,974,713 | B1 | 5/2018 | Song et al. | |
| 10,532,869 | B2 | 1/2020 | Iorio | |
| 10,596,071 | B1 | 3/2020 | Song et al. | |
| 10,597,206 | B2 | 3/2020 | Corey et al. | |
| 11,116,698 | B2 | 9/2021 | Brady et al. | |
| 11,167,894 | B2 | 11/2021 | Corey et al. | |
| 11,771,693 | B2 * | 10/2023 | Iorio | A61J 1/1437 604/890.1 |
| 2014/0187842 | A1 | 7/2014 | Holaday et al. | |

* cited by examiner

MEDICATION CONTAINER AND LID THEREFOR

CROSS-REFERENCE TO RELATED APPLICATION

This application claims priority to and the benefit of the filing date of U.S. Provisional Patent Application No. 63/580,494, filed Sep. 5, 2023, the entirety of which is hereby incorporated by reference herein.

FIELD

This disclosure relates to apparatuses and methods of disposal to reduce opportunities for a user, household member, or others to misuse or divert unused medication, such as, for example and without limitation, post-surgical opioid pills.

BACKGROUND

The current opioid epidemic in the United States remains a significant problem. Leftover opioids following surgery represent significant reservoir of medication available for misuse, abuse and diversion into the community. For 2019, prescription opioids for the management of post-surgical pain resulted in an estimated 129-218 million unused opioid pills. While other efforts to reduce and control the existing supply of prescription opioids have been attempted, these efforts all require active participation by the prescribed user.

Current options for opioid disposal include: medication take back events, medication disposal bins, medication mail back kits, and at home disposal kits. These options all require patient action and all are characterized by low rates of patient compliance. Low rates of disposal compliance lead to the accumulation of unused opioid pills and the potential for misuse, abuse and diversion.

SUMMARY

Disclosed herein, in one aspect, is a lid for inactivating or otherwise deterring use of a medication in a medication container. The lid has a body that is configured to be secured to the medication container. A receptacle has a deterrent composition (e.g., an inactivating composition) therein. A sharp object is movable from a first position that is spaced from the receptacle to a second position in which the sharp object punctures the receptacle. A controller is operable to: initiate a timer having a set duration; and cause the sharp object to move from the first position to the second position upon expiration of the set duration of the timer. A compression assembly applies a pressure to the receptacle so that, when the sharp object moves from the first position to the second position to puncture the receptacle, the compression assembly facilitates flow of the deterrent composition from the receptacle.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1:
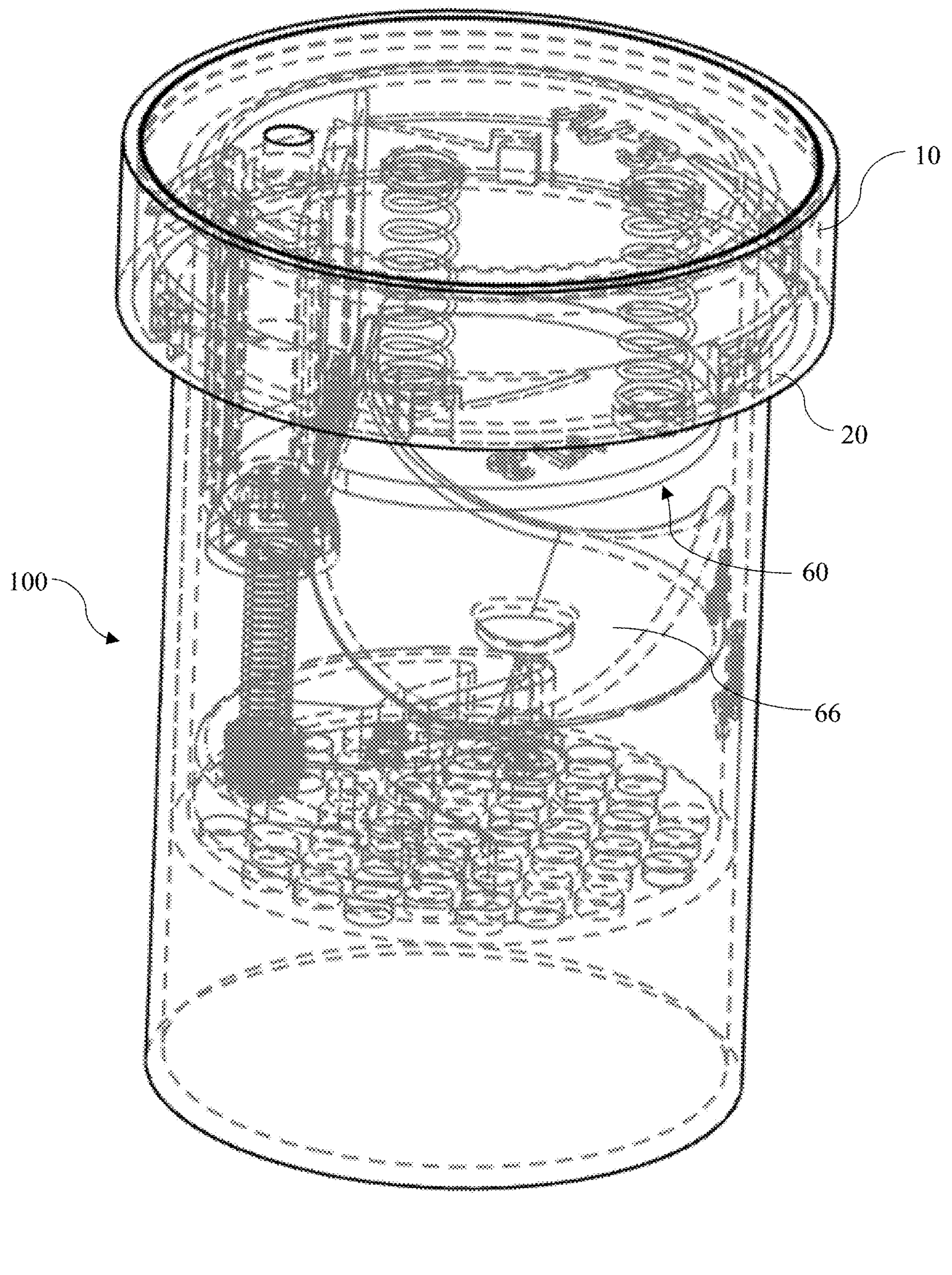
FIG. 1 is a perspective see-through view of a medication container and lid as disclosed herein.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" can include both single and plural references unless the context clearly dictates otherwise. Thus, for example, reference to "a spring" represents disclosure of aspects in which only a single spring is provided, as well as aspects in which a plurality of such springs are provided.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values or characteristics are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step. As used in the specification and in the claims, the terms "comprises" and "comprising" can include the aspects "consists of," "consisting of," "consists essentially of," and/or "consisting essentially of."

The following describe various aspects of certain illustrated embodiments. It should be understood that the embodiments are provided merely as examples, and aspects of each illustrated embodiment can be incorporated into the other embodiment. Further, each illustrated embodiment can be modified further to provide additional embodiments consistent with the present disclosure.

Disclosed herein in various aspects and with reference to FIGS. 1-7, is a lid 10 (e.g., a cap) for a medication container 100. The lid 10 can comprise a body 20 that is configured to be secured to the medication container 100. The lid 10 can contain a receptacle 30 having a deterrent composition therein. A sharp object 40 can be movable relative to the receptacle 30 having the deterrent composition therein from a first position that is spaced from the receptacle to a second position in which the sharp object punctures the receptacle. The sharp object 40 can be coupled directly or indirectly to the body 20. The lid 10 can comprise a controller 50 that is operable to initiate: a timer having a set duration; and cause the sharp object 40 to move from the first position to the second position upon exhaustion of set duration of the timer. A compression assembly 60 can apply a pressure to the receptacle 30 so that, when the sharp object 40 moves from the first position to the second position to puncture the receptacle, the compression assembly facilitates flow of the deterrent composition from the receptacle.

Figure 6:
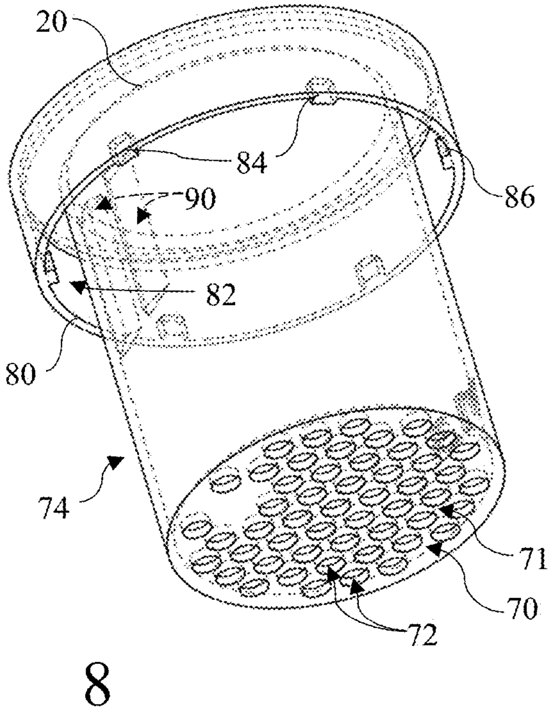
FIG. 6 is a perspective view of an enclosure of the lid of FIG. 1.
Figure 8:
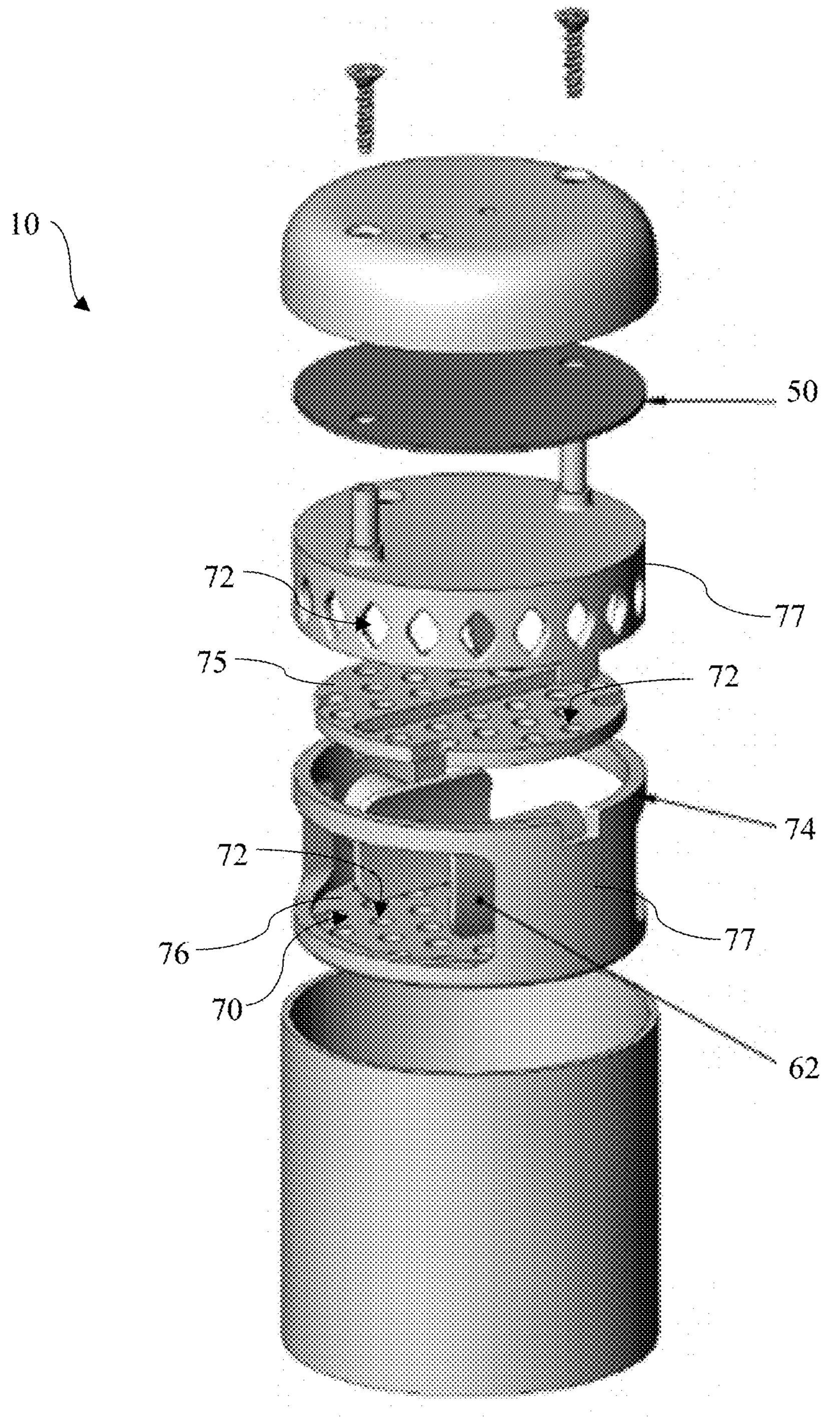
FIG. 8 is an exploded view of an exemplary lid for a medication container as disclosed herein.

As illustrated in FIG. 6, the lid 10 can comprise a permeable barrier 70 that permits the deterrent composition to flow therethrough and inhibits tampering with the internal components of the lid. For example, the permeable barrier 70 can include a grate 71. The grate 71 can define a plurality of openings 72 that permit the deterrent composition to flow therethrough. Although the specific example of a grate is provided, it is contemplated that the permeable barrier can have any open structure that permits flow and passage of the deterrent composition as disclosed herein. Referring also to FIG. 8, in exemplary aspects, the lid 10 can comprise an enclosure 74 that at least partly encloses the receptacle 30. For example, the enclosure 74 can have a top surface 75, a bottom surface 76, and a circumferential wall 77. In some aspects, the barrier 70 can include, or be, the bottom surface 76. The enclosure 74 can define at least one opening 72 that permits passage of the deterrent composition therethrough. In some optional aspects, each of the top surface 75, the bottom surface 76, and the circumferential wall 77 can define one or more openings 72.

In some aspects, the deterrent composition can comprise an inactivating composition. The inactivating composition can comprise one or more inactivating agents. In use, it is contemplated that upon contact between an inactivating agent and the medication within the container, the inactivating agent can be configured to at least partially inactivate the active agent(s) of the medication (by diminishing or eliminating the activity of the active agent(s)). For example, in some aspects, the inactivating agent can be configured to adsorb the active agent(s) and/or to chemically bind the active agent(s) and/or chemically modify or decompose the active agent(s) and/or catalyze decomposition of the active agent(s). In various aspects, the inactivating agent can comprise charcoal (e.g., activated charcoal). Additionally or alternatively, it is contemplated that other inactivating agents can be used. For example, it is contemplated that the inactivating agent can comprise a zeolite, clay, silica gel, aluminum oxide, activated charcoal, or combinations thereof. In further aspects, it is contemplated that the inactivating agent can comprise additional agents that are configured to prevent usage of the medication, such as, for example and without limitation, antagonists (e.g., NALOXONE or NALTREXONE) or oxidizing agents (e.g., peroxides, percarbonates, and the like) for a given medication.

In some optional aspects, the inactivating composition can be or consist of an inactivating agent. In other optional aspects, the inactivating composition can comprise or be provided as a slurry (e.g., a slurry comprising charcoal). Optionally, it is contemplated that powder or granular forms of inactivating agents can be provided within the slurry. In some aspects, the receptacle 30 can contain at least 15 ml, at least 20 ml, or at least 25 ml of inactivating agent. However, it is contemplated that the amount of inactivating composition can vary depending on the amount of active agent in the medication.

In some aspects, the deterrent composition can comprise an emetic (e.g., ipecac syrup or apomorphine). In some aspects, the deterrent composition can comprise an unpleasant smelling chemical (e.g., phenyl isonitrate, or other olfactory repellant). In some aspects, the deterrent composition can comprise a taste deterring additive (e.g., capsaicin or denatium). In some aspects, the deterrent composition can comprise an adhesive (e.g., a two-part epoxy). In further aspects, the deterrent composition can comprise a combination of deterrents disclosed herein.

In some optional aspects, the controller 50 can be operable to start the timer upon opening of the lid from the medication container 100. For example, the lid 10 can comprise a switch or other sensor that is tripped upon application of pressure or torque on the lid to start the timer. In some optional aspects, the controller 50 can be operable to start the timer upon initiation by a user. For example, the lid 10 can comprise a removable nonconductive tab (e.g., a polymer tab, not shown) that interrupts a circuit (e.g., by blocking a terminal of a battery in the lid). Removal of the nonconductive tab can close a circuit to start the timer. Accordingly, the timer can be configured to be initiated upon receiving power from a battery. In other aspects, the lid 10 can comprise another trigger for starting the timer, such as, for example, a momentary switch. The user can be, for example, a pharmacist who starts the timer (e.g., by pulling the removable, nonconductive tab from the lid or pushing the momentary switch) upon filling a prescription. In optional aspects, the pharmacist can set the duration of the timer. In some aspects, the duration of the timer can be a predetermined duration.

Figure 7:
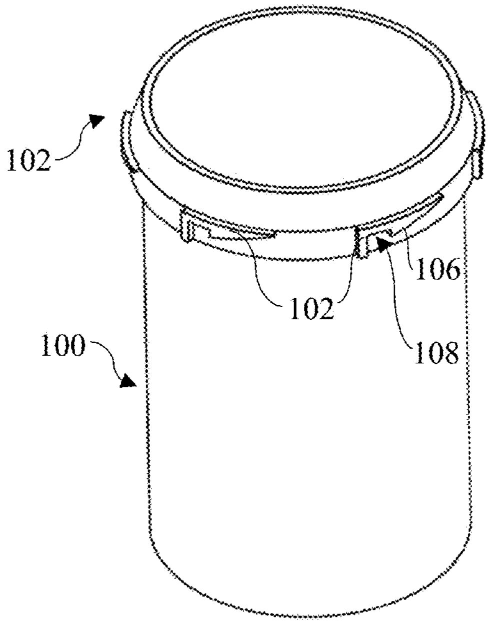
FIG. 7 is a perspective view of the medication container of FIG. 1.
Figure 9:
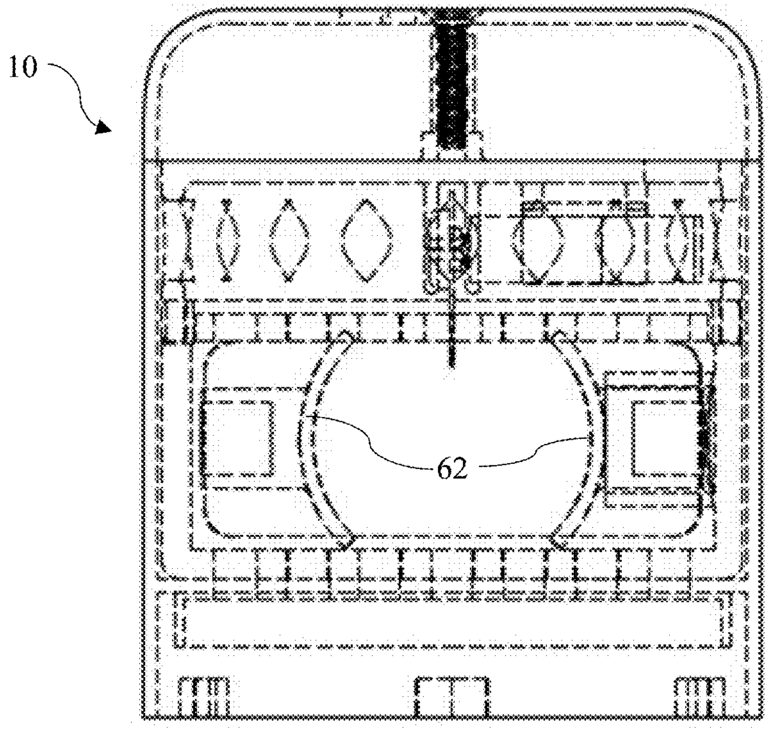
FIG. 9 is a see-through side view of the lid of FIG. 8.

In some aspects, and as illustrated in FIGS. 7-9 the sharp object 40 can be or comprise a blade. In other aspects, as illustrated in FIGS. 1-4, the sharp object 40 can be or comprise a spike (e.g., a needle). More generally, it is contemplated that the sharp object 40 can include structure (e.g., an edge or point) that is sufficiently sharp to puncture a receptacle as disclosed herein.

In some aspects, the lid 10 can comprise a motor 52 coupled to the sharp object 40 and operable to move the sharp object from the first position to the second position. The motor 52 can be in operable communication with the controller. The controller 50 can be configured cause the sharp object 40 to move from the first position to the second position upon operation of the timer for the set duration by causing the motor to move the sharp object from the first position to the second position. In exemplary aspects, the motor 52 can be a direct current (DC) gear motor.

In various aspects, additional mechanisms for moving the sharp object 40 relative to the receptacle 30 are contemplated. For example, in some aspect, the sharp object 40 can be held in tension by a spring in the first position, and expiration of the timer can case a release the sharp object (e.g., pulling of a release pin) so that the spring moves the blade to the second position. In further aspects, an electric, pneumatic, or hydraulic actuator can move the sharp object 40 relative to the receptacle 30.

More generally, the sharp object 40 and the receptacle 30 can be moved relative to each other so that the sharp object punctures the receptacle. For example, in some embodiments, the sharp object can be movable toward the receptacle 30. It is further contemplated that, in additional or alternative aspects, the receptacle 30 can be movable toward the sharp object. For example, in some aspects, the receptacle 30 can be movable on a platform (not shown) toward the sharp object 40.

Figure 2:
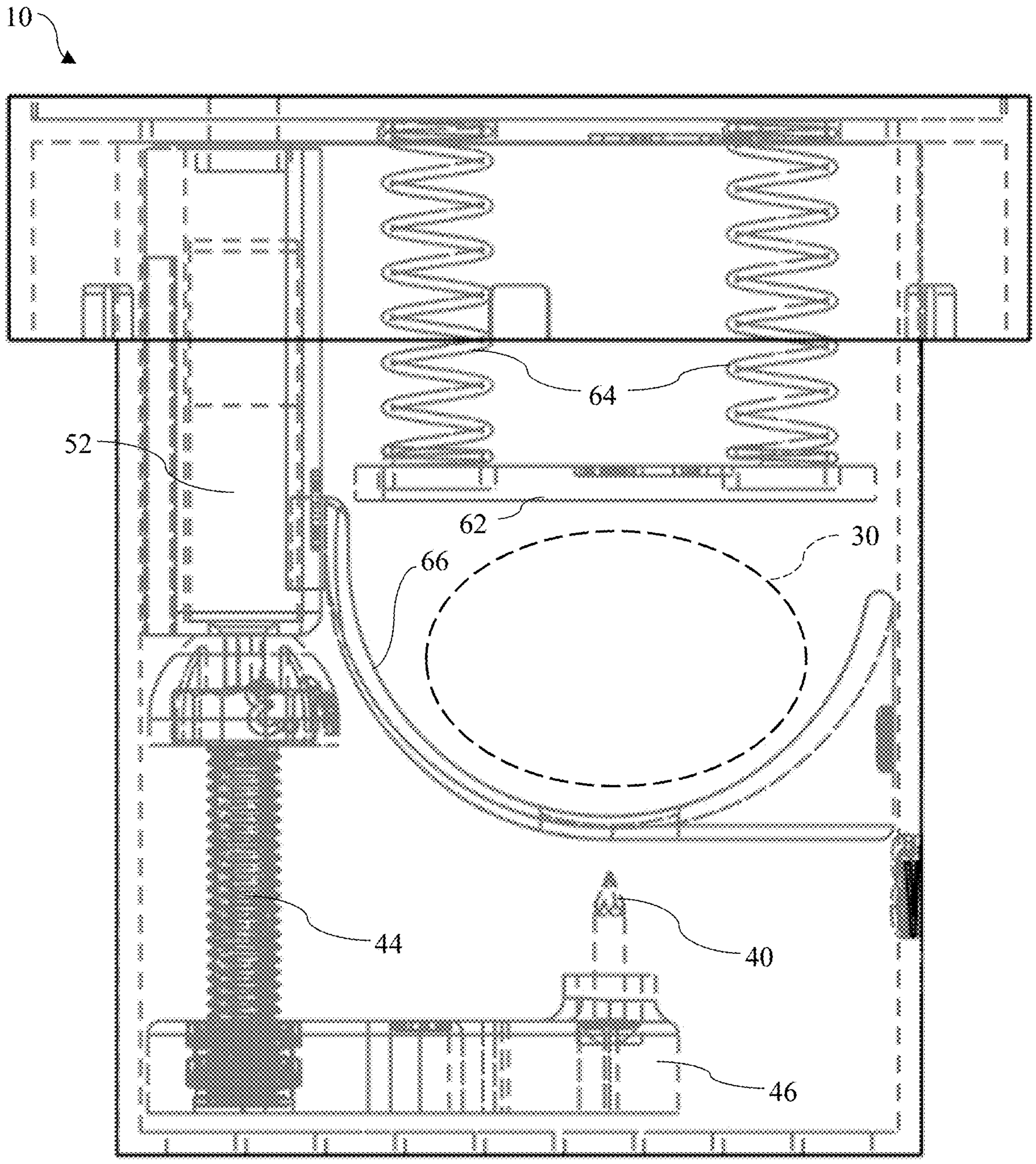
FIG. 2 is a side view of the lid of FIG. 1.
Figure 3:
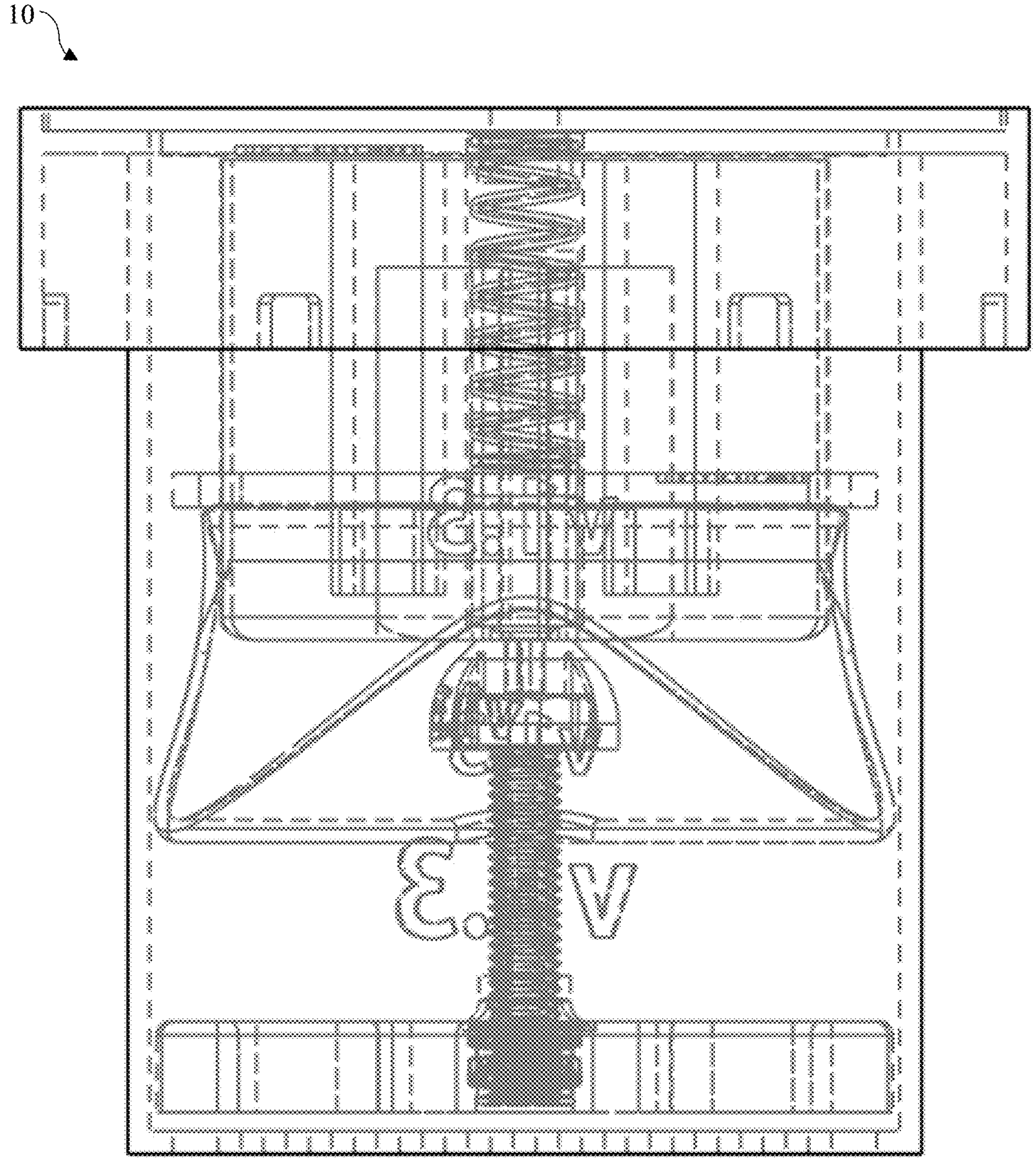
FIG. 3 is a front elevational view of the lid of FIG. 1.
Figure 4:
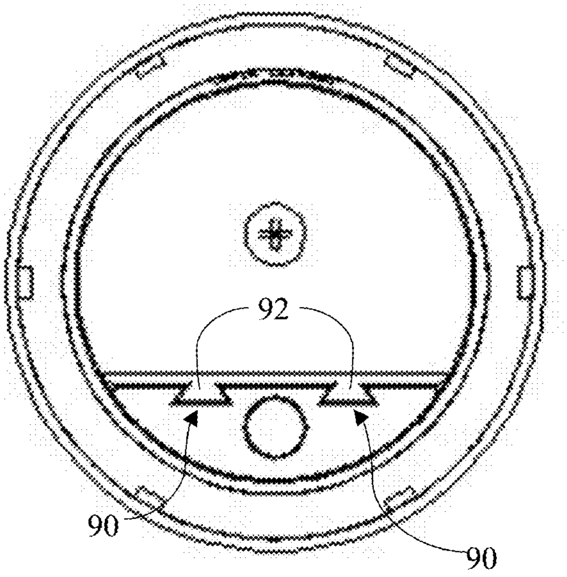
FIG. 4 is a top view of the lid of FIG. 1.
Figure 5:
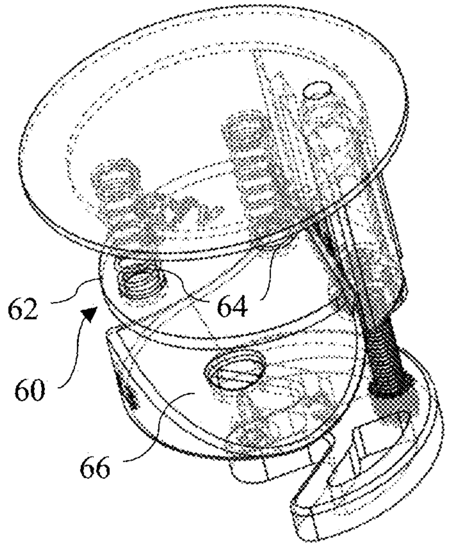
FIG. 5 is a perspective view of internal components of the lid of FIG. 1.
Figure 10:
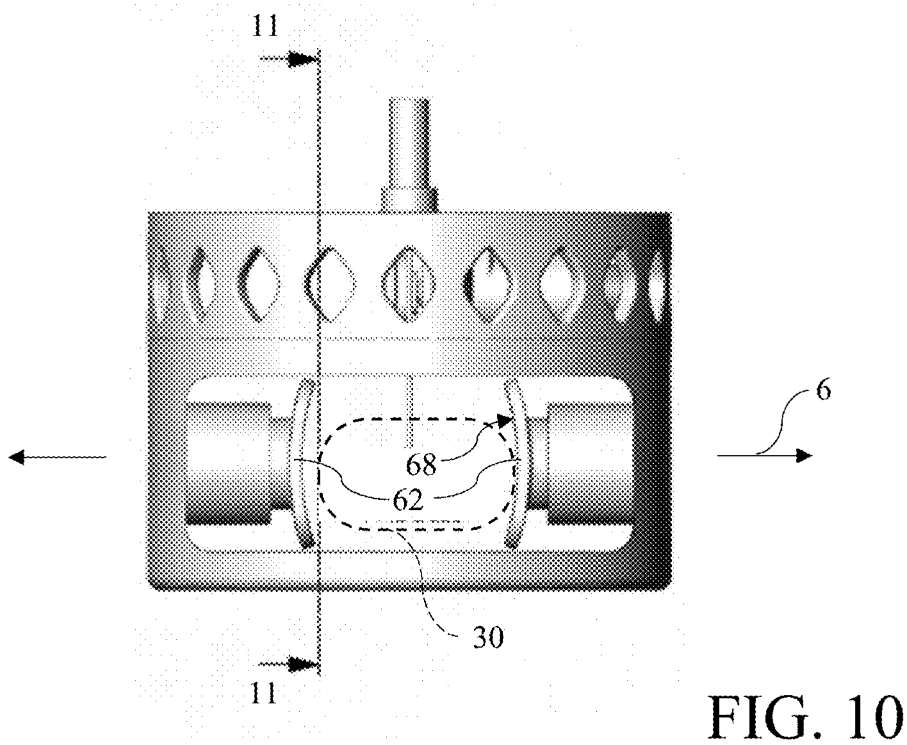
FIG. 10 is a side view of some internal components of the lid of FIG. 8.
Figure 11:
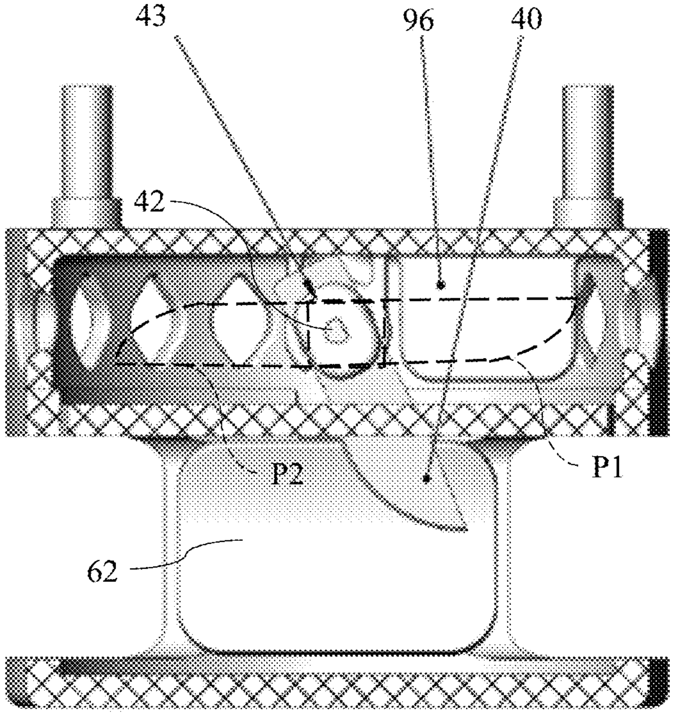
FIG. 11 is a sectional view of the internal components of FIG. 10, taken in the plane 11-11.

In some aspects, the compression assembly 60 can comprise at least one press 62 that is configured to bias against the receptacle 30. The compression assembly 60 can further comprise a biasing element 64 that biases a respective press 62 of the at least one press against the receptacle 30. For example, as illustrated in FIG. 2, the receptacle 30 can be received within a cradle 66. A press 62 pressed downwardly on the receptacle 30 against the cradle 66, biased by two springs. Referring to FIG. 10, a pair of presses 62 be movable along a transverse axis 6. The pair of presses 62 can press against the receptacle 30 on opposing sides, biased inwardly along the transverse axis 6 by respective springs (not shown). In some aspects, the receptacle 30 can have curved sides. Accordingly, in some aspects, the press(es) 62 and/or the cradle 66 can have a concave surface 68 to engage corresponding surfaces of the receptacle 30.

In some aspects, at least a portion of the lid 10 can be receivable within the medication container. For example, in some aspects, the body comprises a downwardly extending circumferential lip 80 that defines an interior 82 that is configured to receive an upper portion 102 of the medication container 100. The downwardly extending circumferential lip 80 can define at least one feature 84 that is configured to engage a complementary feature 104 of the medication container 100 to secure the lid 10 to the medication container. For example, the at least one feature 84 can include one or a plurality of radially inwardly extending projections 86. The corresponding complementary feature(s) 104 can include tapered surfaces 106 that guide the radially inwardly extending projections 86 into respective notches 108.

In some aspects, at least a portion of the receptacle 30 can be disposed within the interior 82 defined by the downwardly extending circumferential lip 80.

Referring to FIGS. 1-5, in some aspects, the motor 52 can be operably coupled to a screw so that the motor drives the screw 44. The sharp object 40 can be coupled to a screw 44. For example, the sharp object 40 can couple to a vertically movable platform 46. The platform 46 can define threads that engage the screw 44 so that, as the screw rotates, the threads of the platform effect upward movement of the platform, thereby drawing the sharp object toward the receptacle 30. The cradle 66 can define an opening through which the sharp object 40 is received to engage the receptacle 30. In some optional aspects, the enclosure 74 can define at least one track that guides movement of the platform 46.

In some aspects, the enclosure 74 can define at least one track 90 along which the press 62 is movable. For example, the enclosure 74 can define a pair of tracks 90 that engage respective features 92 of the press 62. For example, referring to FIG. 4, the tracks 90 can comprise trapezoidal recesses that receive trapezoidal projections of the press 62.

Referring to FIGS. 8-11, in some aspects, the sharp object 40 can be configured to rotate about an axis 42 from the first position (P1) to the second position (P2). For example, the sharp object 40 can be configured to rotate around the axis 42 by at least 90 degrees. In some aspects, the motor can rotate a drive shaft 43 to which the sharp object 40 is coupled. In some aspects, the axis 42 can be horizontal or substantially horizontal. In some aspects, in the first position P1, the sharp object 40 (e.g., blade) can be positioned within or against a blade guard 96.

In exemplary aspects, the lid 10 can define an opening for accessing a momentary switch for initiating the timer. In further aspects, the lid 10 can define an opening for viewing a light emitting diode (LED) that can communicate information such as initiation of the timer, error messages, low battery, etc.

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A lid for a medication container, the lid comprising:

a body that is configured to be secured to the medication container;

a receptacle having a deterrent composition therein;

a sharp object that is coupled to the body, wherein the sharp object is movable relative to the receptacle from a first position that is spaced from the receptacle to a second position in which the sharp object punctures the receptacle;

a controller that is operable to:

initiate a timer having a set duration; and cause the sharp object to move from the first position to the second position upon expiration of the set duration of the timer; and a compression assembly applying a pressure to the receptacle so that, when the sharp object moves from the first position to the second position to puncture the receptacle, the compression assembly facilitates flow of the deterrent composition from the receptacle.

Aspect 2: The lid of aspect 1, further comprising a permeable barrier that permits the deterrent composition to flow therethrough and inhibits tampering.

Aspect 3: The lid of aspect 2, wherein the permeable barrier is a grate.

Aspect 4: The lid of any one of the preceding aspects, wherein the deterrent composition comprises an inactivating composition.

Aspect 5: The lid of aspect 4, wherein the inactivating composition comprises at least one inactivating agent, and wherein the at least one inactivating agent comprises charcoal.

Aspect 6: The lid of any one of the preceding aspects, wherein the deterrent composition comprises a slurry.

Aspect 7: The lid of any one of the preceding aspects, wherein the controller is operable to start the timer upon opening of the lid from the medication container.

Aspect 8: The lid of any one of the preceding aspects, wherein the controller is operable to start the timer upon initiation by a user.

Aspect 9: The lid of any one of the preceding aspects, wherein the sharp object is a blade.

Aspect 10: The lid of any one of the preceding aspects, wherein the sharp object is a spike.

Aspect 11: The lid of any one of the preceding aspects, further comprising a motor coupled to the sharp object and operable to move the sharp object from the first position to the second position, wherein the motor is in operable communication with the controller, and wherein the controller is configured cause the sharp object to move from the first position to the second position upon expiration of the set duration of the timer by causing the motor to move the sharp object from the first position to the second position.

Aspect 12: The lid of aspect 11, wherein the motor is a DC gear motor.

Aspect 13: The lid of any one of the preceding aspects, wherein the sharp object is held in the first position, wherein the controller is operable to cause the sharp object to move from the first position to the second position upon expiration of the set duration of the timer.

Aspect 14: The lid of any one of the preceding aspects, wherein the sharp object is configured to rotate about an axis.

Aspect 15: The lid of any one of the preceding aspects, wherein the sharp object is configured to rotate about the axis by at least 90 degrees.

Aspect 16: The lid of any one of aspects 11-13, further comprising:

a screw coupled to the motor; and a platform coupled to the sharp object and movable along the screw, wherein rotation of the motor effects linear movement of the sharp object.

Aspect 17: The lid of any one of the preceding aspects, wherein the compression assembly comprises:

at least one press that is configured to bias against the receptacle; and at least one biasing element, wherein each biasing element of the at least one biasing element biases a respective press of the at least one press against the receptacle.

Aspect 18: The lid of aspect 17, wherein the at least one press comprises a pair of presses that are movable radially inwardly along a transverse axis.

Aspect 19: The lid of aspect 17 or aspect 18, wherein each press of the at least one press has a concave surface that is configured to contact the receptacle.

Aspect 20: The lid of aspect 17, wherein the at least one press is vertically movable relative to the receptacle, wherein the at least one biasing element comprises a pair of biasing elements that bias the at least one press downwardly.

Aspect 21: The lid of any one of the preceding aspects, further comprising an enclosure that at least partly encloses the receptacle, wherein the enclosure defines at least one opening that permits passage of the deterrent composition therethrough.

Aspect 22: The lid of aspect 21, wherein the enclosure has a top surface, a bottom surface, and a circumferential wall, wherein each of the top surface, the bottom surface, and the circumferential wall define one or more openings of the at least one opening.

Aspect 23: The lid of any one of the preceding aspects, wherein at least a portion of the lid is receivable within the medication container.

Aspect 24: The lid of aspect 23, further comprising an enclosure that at least partly encloses the receptacle, wherein the body comprises a downwardly extending circumferential lip that defines an interior that is configured to receive an upper portion of the medication container, wherein at least a portion of the receptacle is disposed within the interior defined by the downwardly extending circumferential lip.

Aspect 25: The lid of aspect 24, wherein the downwardly extending circumferential lip defines at least one feature that is configured to engage a complementary feature of the medication container to secure the lid to the medication container.

Aspect 26: The lid of aspect 25, wherein the at least one feature comprises a radially inwardly extending projection.

Aspect 27: An assembly comprising:

a medication container; and a lid as in any one of the preceding aspects, wherein the lid is secured to the medication container.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A lid for a medication container, the lid comprising:

a body that is configured to be secured to the medication container;

a receptacle having a deterrent composition therein;

a sharp object that is coupled to the body, wherein the sharp object is movable relative to the receptacle from a first position that is spaced from the receptacle to a second position in which the sharp object punctures the receptacle;

a controller that is operable to:

initiate a timer having a set duration; and cause the sharp object to move from the first position to the second position upon expiration of the set duration of the timer; and a compression assembly applying a pressure to the receptacle so that, when the sharp object moves from the first position to the second position to puncture the receptacle, the compression assembly facilitates flow of the deterrent composition from the receptacle.

2. The lid of claim 1, further comprising a permeable barrier that permits the deterrent composition to flow therethrough and inhibits tampering.

3. The lid of claim 2, wherein the permeable barrier is a grate.

4. The lid of claim 1, wherein the deterrent composition comprises an inactivating composition.

5. The lid of claim 4, wherein the inactivating composition comprises at least one inactivating agent, and wherein the at least one inactivating agent comprises charcoal.

6. The lid of claim 1, wherein the deterrent composition comprises a slurry.

7. The lid of claim 1, wherein the controller is operable to start the timer upon opening of the lid from the medication container.

8. The lid of claim 1, wherein the controller is operable to start the timer upon initiation by a user.

9. The lid of claim 1, wherein the sharp object is a blade.

10. The lid of claim 1, wherein the sharp object is a spike.

11. The lid of claim 1, further comprising a motor coupled to the sharp object and operable to move the sharp object from the first position to the second position, wherein the motor is in operable communication with the controller, and wherein the controller is configured cause the sharp object to move from the first position to the second position upon expiration of the set duration of the timer by causing the motor to move the sharp object from the first position to the second position.

12. The lid of claim 11, further comprising:

a screw coupled to the motor; and a platform coupled to the sharp object and movable along the screw, wherein rotation of the motor effects linear movement of the sharp object.

13. The lid of claim 1, wherein the sharp object is held in the first position, wherein the controller is operable to cause the sharp object to move from the first position to the second position upon expiration of the set duration of the timer.

14. The lid of claim 1, wherein the sharp object is configured to rotate about an axis.

15. The lid of claim 1, wherein the compression assembly comprises:

at least one press that is configured to bias against the receptacle; and at least one biasing element, wherein each biasing element of the at least one biasing element biases a respective press of the at least one press against the receptacle.

16. The lid of claim 15, wherein the at least one press comprises a pair of presses that are movable radially inwardly along a transverse axis.

17. The lid of claim 15, wherein the at least one press is vertically movable relative to the receptacle, wherein the at least one biasing element comprises a pair of biasing elements that bias the at least one press downwardly.

18. The lid of claim 1, further comprising an enclosure that at least partly encloses the receptacle, wherein the enclosure defines at least one opening that permits passage of the deterrent composition therethrough.

19. The lid of claim 18, wherein the enclosure has a top surface, a bottom surface, and a circumferential wall, wherein each of the top surface, the bottom surface, and the circumferential wall define one or more openings of the at least one opening.

20. An assembly comprising:

a medication container; and a lid as in claim 1, wherein the lid is secured to the medication container.

* * * * *